United States Patent Office 3,535,389
PROCESSES FOR OBTAINING SUBSTANTIALLY PURE 4,4' - DIHYDROXY - DIPHENYL-PROPANE-2,2
Jan Ide de Jong, Blaricum, Netherlands, assignor to Koninklijke Zwavelzuurfabrieken v/h Ketjen N.V., Amsterdam, Netherlands, a corporation of the Netherlands
Continuation-in-part of application Ser. No. 85,754, Jan. 30, 1961. This application May 24, 1963, Ser. No. 283,088
Claims priority, application Netherlands, Feb. 12, 1960, 248,384
Int. Cl. C07c 37/22
U.S. Cl. 260—619   7 Claims

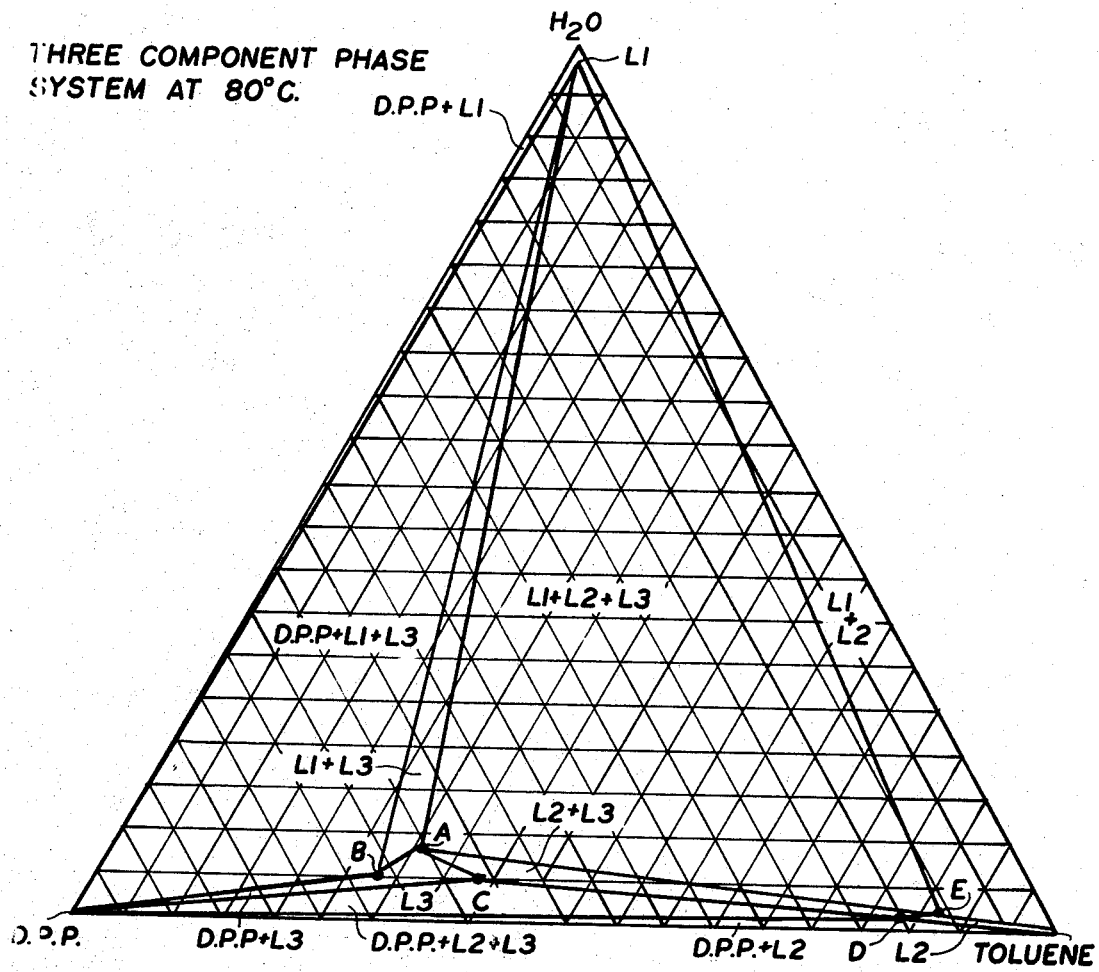

ABSTRACT OF THE DISCLOSURE

Substantially pure diphenylol-propane is obtained, from the acid containing condensation reaction product of phenol with acetone in the presence of an acid catalyst, by heating a mixture of such reaction product with water and a water immiscible organic solvent selected from toluene, xylene, monochlorobenzene, 1,1,2,2-tetrachloroethane and 1,2-dichloroethane, with the amount of water being between 10% and 1000%, by weight, and the amount of the solvent being between 10% and 400%, by weight, each based on the amount of diphenyl-propane, and with the temperature to which the mixture is heated being below the boiling point thereof and in the range between 70° C. and 100° C., at which temperature there is formed a wholly liquid system including an organic phase containing the solvent, at least 20% of diphenylol-propane and a minor part of water, and an aqueous, acid-containing phase.

---

This invention relates generally to the production of 4,4'-dihydroxy-diphenyl-propane-2,2, hereinafter referred to as diphenylol-propane or D.P.P., and more particularly is directed to improved processes for obtaining substantially pure diphenylol-propane. The present application is a continuation-in-part of my copending application for U.S. Letters Patent Ser. No. 85,754, filed Jan. 30, 1961 and now abandoned.

It is well known that diphenylol-propane may be obtained by the condensation of phenol with acetone in the presence of acidic condensing agents. The process has been the subject of many experimental investigations designed to improve the yield and the purity of the diphenylol-propane thus obtained. For example, it has been found that the strength of the acid solution is of importance, sulphuric acid of about 70% having been used for this purpose, and that the viscosity of the reaction mixture may be reduced by employing excess amounts of either phenol or sulfuric acid.

In all these modifications, the diphenylol-propane is obtained as very fine crystals, which causes difficulty in effecting the separation of the solid product from the mother liquid by either filtering or centrifuging.

It has also been proposed to carry out the manufacture of diphenylol-propane in the presence of inert liquid diluents, for example, liquid hydrocarbons, as in British Pat. 428,944, corresponding to U.S. Pat. No. 1,978,949, or halogenated hydrocarbons, as in British Pat. 557,976, which diluents do not participate in the reaction, but are capable of preventing, or at least lessening, side reactions and, at the same time, ensure that the end product will be in a form that can be centrifuged or filtered.

The product obtained by these methods employing diluents has either toluene present in an amount of about 3 to 5%, or carbon tetrachloride present in an amount of about 5%, calculated on the amount of phenol used, and has an average melting point of 153 to 157° C. and a purity of 98%. Its color, expressed as the extinction (×100) of its 5% alcoholic solution at 430 mu, is about 10 to 20, if for each batch fresh sulphuric acid has been used, and about 30 to 40, if the acid is used for a second time.

Although centrifuging is less difficult than if no organic diluent is used, this step of the process is still a source of difficulty. After centrifuging, the product must be washed with water, neutralized and purified by steaming. Further, in order to reduce the costs involved, the acid must be recovered and recirculated or reused after being brought up to strength by adding strong acid thereto. If fresh acid is used for each batch, the amount of acid required for each batch is about four times the amount of diphenylol-propane that is obtained. In case the acid is reused, the amount of new acid used for each batch can be reduced to about one-quarter, so that the ratio of diphenylol-propane obtained to sulphuric acid used becomes about one to one.

It is also known that substantially pure diphenylol-propane may be obtained by heating the crude condensation product, which may still contain acid with water, in the presence of a base (pH-7-9).

However, the product thus purified still contains those impurities which are not easily soluble in water, such as isomers of D.P.P. and lower condensates of phenol and acetone (the so-called resin). These impurities which are not very soluble in water may be removed by recrystallizing the D.P.P. out of an organic solvent, for example, toluene or xylene. Such a procedure for removing the water insoluble impurities has its disadvantages as relatively large quantities of solvent are required (for instance 3 to 10 times the quantity of D.P.P.), and the starting product must be acid-free, as otherwise the D.P.P. might decompose during recrystallization.

Accordingly, it is an object of the present invention to provide processes for obtaining pure diphenylol-propane, and which avoid the above mentioned disadvantages of the processes previously proposed for that purpose.

In accordance with an aspect of this invention, diphenylol-propane of greatly improved color and purity is obtained from the condensation of phenol with acetone in the presence of a strong acid and promoter by adding suitable amounts of additional water and a water immiscible organic solvent or diluent preferably selected from the group consisting of toluene, xylene, monochlorobenzene, 1,1,2,2-tetrachloroethane and 1,2-dichloroethane; heating the mixture to a temperature which is below the boiling point thereof and at which temperature there forms a wholly liquid system having present therein at least an organic phase containing at least 20%, by weight, of diphenylol-propane, organic solvent and minor parts of water; cooling the system below the crystallization point thereof so that pure diphenylol-propane crystallizes from that organic phase; and separating the pure crystalline diphenylol-propane from the liquid.

It has been found that pure diphenylol-propane may be obtained in accordance with the invention, as described above, by adding the selected organic solvent to the condensation reactants, so that the condensation reaction of phenol with acetone occurs in the presence of the organic solvent and thereafter adding the water, or by adding the organic solvent and additional water to the acid-containing condensation reaction product or crude diphenylol-propane.

In order to obtain the desired pure diphenylol-propane, the selected organic solvent or diluent is added in an amount between 10% and 400%, by weight, of the amount of diphenylol-propane in the condensation reaction product or to be obtained from the condensation reaction, while the water is added in an amount between 10% and 1000%, by weight, of said amount of diphenylol-propane. Further, in order to obtain the wholly liquid system, the mixture is heated to a temperature between 70° and 100° C.

The advantages of the processes embodying this invention over those previously proposed, as in the above identified patents, are as follows:

Fresh acid is always used, but the amount of acid required is not more than the amount of diphenylol-propane obtained;

No difficulties whatever are encountered in effecting the isolation of the diphenylol-propane by centrifugation or filtration, if necessary or desired.

The product obtained is practically colorless, in that it has a color of 2 to 10, calculated as above, instead of 10 to 20 or 30 to 40, as in the products previously obtained;

The diphenylol-propane obtained has a solidification point of 156° C., instead of a melting point of 153 to 157° C.; and The purity of the obtained diphenylol-propane is about 99.9% instead of 98%.

The diluents which are suitable for use in the process according to the invention have the following general characteristics:

Immiscible, or at the most only poorly soluble in water, even at temperatures in the region of 50 to 100° C.;

The solubility of diphenylol-propane in the diluent or solvent preferably should be poor, in order that only a small quantity of diphenylol-propane is taken up in the organic solvent, while the organic impurities of the diphenylol-propane, such as, the isomeric diphenylol-propane compounds, the formed resin and also unreacted phenol, must be substantially soluble in the diluent; and The diluent should provide a mixture with diphenylol-propane and water that is fully liquid upon heating to a temperature that lies beneath the boiling point of the azeotrope. Thus, generally, the boiling point of the azeotrope of water and organic solvent must lie between approximately 70° C. and 100° C. (at atmospheric pressure).

Although specific solvents have been mentioned above as being usable in the processes embodying the invention, it is to be noted that other organic solvents or diluents can be used provided that they have the above noted necessary characteristics.

Prior to the crystallization of the diphenylol-propane from the organic fraction of the wholly liquid system, the liquid phases of the latter are separated and the acidic aqueous phase is discarded, whereupon the organic fraction is neutralized to a pH of about 4.0 by adding fresh water or a basic solution before cooling to effect crystallization. After distillation of the mother lye, the organic solvent can be reused. This mother lye, from which the pure diphenylol-propane has been crystallized, contains the impurities and unreacted phenol which can be separated by distilling off the solvent, whereas the acidic aqueous phase can be reused for the melting of the next batch.

As shown on the accompanying drawing, which represents the three phase diagram of diphenylol propane, toluene and water at 80° C., the system formed by the selected organic solvent or diluent, water and the crude diphenylol-propane at a temperature slightly below the boiling point of the mixture, may have a phase $L_3$ which consists mainly of diphenylol-propane and the organic solvent, an aqueous acidic phase $L_1$, and also an organic phase $L_2$ containing little diphenylol-propane. In the case of such a three phase system, the crystallization point below which the organic phase rich in diphenylol-propane is cooled to cause crystallizing of the latter is the ternary transition point of that organic phase. However, the wholly liquid system may contain only a single organic phase, that is, be only a two phase system, in which case crystallization of the diphenylol-propane is obtained by cooling the organic phase below the crystallization point thereof.

The processes embodying the invention may be performed continuously or be of the batch type, and are illustrated by the following specific examples:

EXAMPLE I 200 g. of crude D.P.P., containing 0.06 percent $H_2SO_4$ were heated in a round bottom flask together with 600 g. of water, 3 g. of NaCl and 200 ml. toluene until the D.P.P. wholly liquified (at a temperature below about 85° C.). Thereupon the mixture was cooled down to 60° C. with stirring in about 15 minutes. Then the stirring was stopped, and the upper or toluene containing layer was separated (198 ml.) with about 400 ml. of water. After adding 400 ml. fresh water, the D.P.P. was steamed until all toluene had been removed (8 ml. were caught). The D.P.P. melt thereafter was poured out. After drying, this product had a melting point of 156.7–159.3° C. and a contents of p.p.′ isomer of 99.9%; the solidification point was 156.6° C.

The crude product had a p.p.′ content of 97%, and a melting point of 137–156° C. After cooling to effect the isolation of the D.P.P. that solidified in crystalline form from the separated toluene layer and the separated water layer, the efficiency of the purification process amounted to 96.5%, that is to say, about 99.5% calculated on pure p.p.′ isomer. The loss of toluene amounted to 3 ml.

EXAMPLE II

The toluene of Example I was replaced by the same amount of technical xylene. The purification was effected in a manner analogous to that described in Example I, and pure D.P.P. was obtained with a melting point of 155.9–159.1° C.

EXAMPLE III

The 200 ml. of toluene of Example I were replaced by 200 ml. monochlorobenzene. After heating the mixture to 90° C. it was cooled down slowly to 60° C., after which the whole mixture was placed on a glass-filter, and suction was applied. The D.P.P. which remained on the filter was washed with cold water until the filtrate remained clear, after which the washed product was brought back into the round bottom flask and steamed out. The melting point of the pure D.P.P. thus obtained was 155.3–159.2° C.

EXAMPLE IV

The method described in Example I was followed until the toluene layer had separated. Then the crystalline solidified D.P.P. was remelted with 400 ml. of fresh water, 2 g. of NaCl and 200 ml. fresh toluene. After cooling down to 55° C., the toluene layer was removed, and the crystal mass was freed of residual toluene by steaming, after which the liquid D.P.P. was cooled while being stirred. The product obtained had a melting point of 157.1–159.4° C., and a p.p.′ content of 99.9%.

EXAMPLE V 200 g. of crude D.P.P. were melted with 600 ml. of water and 3 ml. NaCl while being stirred, after which the emulsion was cooled down to 30° C. within 60 minutes time. Then the crystalline solidified product was stirred with 200 ml. of benzene for 10 minutes. The benzene layer (190 ml.) was separated, and the residual benzene was removed by steam distillation, after which the melted D.P.P. was cooled down to 60° C. while being stirred. The thus obtained clear and white coarse crystals had a melting point of 155.8–158.7° C.

EXAMPLE VI 200 g. of crude D.P.P. were melted with 600 g. of water and 200 ml. of tetra chloro-ethane, and then cooled down to room temperature, after which the crystalline solidified D.P.P. was separated by centrifuging. The thus obtained product was washed in the centrifuge with water and thereafter was dried. The melting point was 156.8–158.9° C.

EXAMPLE VII 200 g. of crude D.P.P. were heated in 300 g. of water and 90 ml. of toluene to 82° C., and then the mixture was cooled down to 20° C. and centrifuged. The D.P.P. had a p.p.' content of 99.8%, and a melting point of 156.7–159° C.

EXAMPLE VIII 395 g. of phenol (4.2 moles) are dissolved in 736 g. toluene and, while stirring, 522 g. of 77.5 percent sulphuric acid and 1.5 ml. thioglycolic acid are added at a temperature of 20° C. 116 g. (2 moles) of acetone are slowly added to the mixture over a period of 3 hours at 25° C. The mixture is stirred for another 7 hours at 35° C. to complete the condensation reaction of phenol with acetone in the presence of toluene as the diluent in accordance with this invention. Thereafter, 1060 g. of water are added and the whole is heated to a temperature of 82° C. The aqueous acid layer is discarded and 1000 ml. fresh water are added. The pH of the aqueous layer is adjusted to 4 by adding sodium bicarbonate while intensely stirring. Then crystallization is effected by cooling the mixture slowly down to 25° C. (within about 3 hours), while stirring. The crystallized diphenylol-propane is centrifuged and dried. The yield is 425 g. (93%), and has a melting point of 156.4–158° C. The toluene layer mother lye from which the diphenyl-propane was crystallized contained 14 g. of phenol and 17.4 g. of diphenylol-propane isomers. In the acid and water layers, 10.2 g. of phenol and 7.6 g. of phenol sulfonic acid were still present.

EXAMPLE IX

In a manner analogous to that described in Example VIII, 197 g. of phenol (2.1 moles) are condensed with 58 g. of acetone (1 mole) in the presence of 270 g. of 80 percent sulphuric acid, 1 ml. thioglycolic acid and 972 g. of monochlorobenzene as the diluent in accordance with this invention. The acetone was added over a period of 1 hour at 25° C., and thereafter stirring was continued, at a temperature of 35° C. for a further 3.5 hours. The yield of pure diphenylol-propane was 205.2 g. (corresponding to about 90% of the theoretical value) and had a melting point of 156.6 to 158.4° C.

EXAMPLE X

The 972 g. of monochlorobenzene in Example IX were replaced by 680 g. of 1,1,2,2-tetrachloroethane. In a similar manner diphenylol-propane was prepared. The dosing time of the acetone at 25° C. was again 1 hour, but thereafter the stirring was continued at 35° C. for only 2.5 hours to complete the condensation reaction. The yield was 187.5 g. of pure diphenylol-propane (about 82% of the theoretical value), and had a melting point of 156.4 to 158° C.

Although specific examples of processes embodying the invention are given above, such examples are merely illustrative, and the invention is not limited thereto except as defined in the appended claims.

What is claimed is:

1. In the process for producing diphenylol-propane by the condensation reaction of phenol with acetone in the presence of an acid catalyst, the steps for obtaining substantially pure diphenylol-propane comprising heating a mixture consisting essentially of the acid containing reaction product, water in an amount between 10% and 1000%, by weight, of the amount of diphenylol-propane in said reaction product, and a water immiscible organic solvent in an amount between 10% and 400%, by weight, of said amount of diphenylol-propane, said mixture being heated to a temperature between 70° C. and 100° C. which is below the boiling point thereof, and said organic solvent being selected from the group consisting of toluene, xylene, monochlorobenzene, 1,1,2,2-tetrachloroethane and 1,2-dichloroethane to form, with said diphenylol-propane and water in said relative amounts, a system which is wholly liquid at said temperature and which includes at least a first organic phase containing said solvent, at least 20% of diphenylol-propane and a minor part of water, and a second aqueous, acid-containing phase;

cooling below the crystallization point of said system, thereby to cause substantially pure diphenylol-propane to crystallize therefrom; and collecting the crystallized pure diphenylol-propane.

2. The process as in claim 1:
wherein said aqueous phase is separated from said organic phase prior to the cooling of the latter to effect crystallization of the diphenylol-propane therefrom.

3. The process as in claim 2;
further comprising adjusting the pH value of said organic phase to approximately 4.0 after separation of said aqueous phase therefrom.

4. The process as in claim 2;
further comprising distilling off the organic solvent from the remainder of said organic phase from which the diphenylol-propane is crystallized, and recovering the distilled organic solvent for reuse in subsequent purifications of diphenylol-propane.

5. The process as in claim 1;
wherein said water of the mixture is in the form of a dilute aqueous solution of sodium chloride.

6. The process as in claim 1;
wherein said mixture is formed by adding said water and said organic solvent to said reaction product at the completion of the condensation reaction.

7. The process as in claim 1;
wherein said organic solvent is added to the condensation reactants so that the condensation reaction occurs in the presence of said organic solvent, and said water is added upon the completion of the condensation reaction.

References Cited

UNITED STATES PATENTS 1,978,949 10/1934 Kohn et al.
2,959,622 11/1960 Grimme et al.

FOREIGN PATENTS 557,976 12/1943 Great Britain.

OTHER REFERENCES

Weissberger, A., Technique of Organic Chemistry, N.Y., Interscience Publishers, Inc., 1956, vol. III, part I (pp. 400 and 425–426).

LEON ZITVER, Primary Examiner

N. P. MORGENSTERN, Assistant Examiner